United States Patent [19]

Jansen et al.

[11] Patent Number: 5,128,801
[45] Date of Patent: Jul. 7, 1992

[54] INTEGRATED OPTICAL SIGNAL AMPLIFIER

[75] Inventors: Richard Jansen, Avon; Pascale LaBorde, Champagne; Christian Lerminiaux, Montmorency; Carlos O. N. Benveniste, Vulaines, all of France; Douglas W. Hall, Corning, N.Y.

[73] Assignee: Corning Incorporated, Corning, N.Y.

[21] Appl. No.: 647,778

[22] Filed: Jan. 30, 1991

[51] Int. Cl.⁵ .................... G02B 6/30; G02B 6/26; H01S 3/16
[52] U.S. Cl. .................... 359/343; 359/341; 359/347; 372/40
[58] Field of Search ........... 330/4.3; 350/96.11, 350/96.13; 455/610; 359/341, 343, 347; 385/1; 372/7, 40

[56] References Cited

U.S. PATENT DOCUMENTS

| | | | |
|---|---|---|---|
| 3,154,751 | 10/1964 | Wentz et al. | 330/4.3 |
| 3,273,072 | 9/1966 | Koester et al. | 330/4.3 |
| 3,716,804 | 2/1973 | Groschwitz | 307/312 |
| 3,781,550 | 12/1973 | Zeidler | 250/211 |
| 3,868,589 | 2/1975 | Wang | 330/4.3 |
| 4,162,460 | 7/1979 | Gondo | 330/4.3 |
| 4,338,570 | 7/1982 | Kurnit | 330/4.6 |
| 4,674,830 | 6/1987 | Shaw et al. | 372/6 |
| 4,712,075 | 12/1987 | Snitzer | 330/4.3 |
| 4,723,824 | 2/1988 | Shaw et al. | 372/6 |
| 4,765,702 | 8/1988 | Dohan | 350/96.12 |
| 4,933,262 | 6/1990 | Bequin | 350/96.12 |
| 4,943,130 | 7/1990 | Dannoux et al. | 350/96.11 |

FOREIGN PATENT DOCUMENTS

| | | |
|---|---|---|
| 0187467 | 7/1986 | European Pat. Off. |
| 0292277 | 11/1988 | European Pat. Off. |
| 2140500 | 8/1971 | Fed. Rep. of Germany |
| 2260987 | 12/1972 | Fed. Rep. of Germany |

OTHER PUBLICATIONS

Masuda et al; "High Gain ... Fibre Amplifier"; Elect. Lett., vol. 26, #10, May 10, 1990, pp. 661-662.
Breton et al.; "Numerical Simulation ... Components"; Proc. SPIE, vol. 1128, pp. 80-86, 1989; abst only provided.
Beguin et al; "Fabrication ... for Exchange in Glass"; J. Lightwave Tech., vol. 6, #10, pp. 1483-1487, Oct. 1988; abst only provided.
E. Desurvire et al., "High-gain erbium-doped traveling-wave fiber amplifier", Optical letters, vol. 12, No. 11, pp. 388-390, Nov., 1987.
M. C. Farries et al., "Operation of Erbium-Doped Fiber Amplifiers and Lasers Pumped with Frequency-Doubled Nd:YAG Lasers", Journal of Lightwave Technology, vol. 7, No. 10, pp. 1474-1477, Oct., 1989.
Najafi et al., "Ion-exchanged rare-earth doped waveguides", SPIE vol. 1128 Glasses for Optoelectronics, 1989, pp. 142-144.
Najafi et al., "Ion-exchanged rare-earth doped waveguides", First International Congress of Optical Science and Engineering, Apr. 24-28, 1989.
Barnes et al., "$Er^{3+}-Yb^{3+}$ and $Er^{3+}$ doped fiber lasers", Journal of Lightwave Technology, vol. 7, No. 10, Oct., 1989, pp. 1461 ff.
R. G. Walker et al. "Integrated Optical Waveguiding Structures made by Silver Ion-Exchange in Glass. 2:Directional Coupler and Bends"; Applied Optics, Jun. 15, 1983, vol. 22, No. 12, 1929-1936.

Primary Examiner—Nelson Moskowitz
Attorney, Agent, or Firm—K. McNeill Taylor, Jr.

[57] ABSTRACT

An optical signal amplifier with a waveguide path integrated into a glass body that is doped with optically active material. The signal to be amplified is transmitted through the waveguide and the pump power is coupled into the waveguide at one end. The waveguide comprises closely spaced adjacent guide lengths in the form of a spiral, zigzag paths between mirrors, or parallel paths with connecting semicircles at alternating ends of succeeding pairs of paths.

13 Claims, 2 Drawing Sheets

INTEGRATED OPTICAL SIGNAL AMPLIFIER

BACKGROUND OF THE INVENTION

The present invention relates to an optical signal amplifier and, more specifically, such an amplifier made by integrated optics technology.

Optical waveguide signal amplifiers are known comprising a glass optical waveguide fiber doped with an optically active material, for example a rare earth metal oxide, to develop an amplifier effect by stimulated emission These amplifiers include means for injecting into the amplifier fiber, at one of its ends, pump light emitted from a laser at the wavelength of absorption of the doped glass amplifier fiber, along with modulated signal light at a wavelength in the spectral band of emission of the doped glass amplifier. The amplified optical signal is extracted from the waveguide at the other end of the amplifier fiber.

Such an amplifier is described in E. Desurvire et al., "High-gain erbium-doped traveling-wave fiber amplifier", Optical Letters, vol. 12, no. 11, pages 388-390, Nov., 1987. M. C. Farries et al., "Operation of Erbium-Doped Fiber Amplifiers and Lasers Pumped with Frequency-Doubled Nd:YAG Lasers", Journal of Lightwave Technology, vol. 7, no. 10, pages 1474-1477, Oct., 1989, also is directed to an amplifier of this type.

Such amplifiers are intended for use in long distance optical fiber telecommunications systems which today appear very promising. Present day systems include opto-electronic repeaters spaced out along the length of the fiber to amplify the optical signals, as the attenuation of the fiber is on the order of tenths of decibels per kilometer. These opto-electronic repeaters include an optical to electrical converter at the input, an electronic amplifier of the electrical signal, and an electrical to optical converter at the output. Accordingly, these repeaters are complicated, cumbersome and expensive.

Therefore it is desirable to replace these opto-electronic repeaters with optical signal amplifiers of the type described above, which present the advantage of eliminating the opto-electronic conversion of signals by acting directly on the optical signal. In order to achieve the level of amplification necessary, the length of the amplifier waveguide is currently of the order of one to several meters, for a signal transmitted at a wavelength of 1.5 $\mu$m, which is one of the typical wavelengths used in optical telecommunications. In addition, the following additional components are also required: means for supporting the optical fiber, which is sensitive to perturbations; means for connecting the ends of the fiber to input and output fibers; and, means for optically coupling the amplifier fiber to a pump-laser. Assembly of all of these individual means is difficult, hence expensive, and the amplifier which results is cumbersome.

Laser waveguides have been fabricated using ion exchange in glass. In Najafi et al., "Ion-exchanged rare-earth doped waveguides", SPIE Vol. 1128 Glasses for Optoelectronics, 1989, pp. 142-144, an example is given of a slab waveguide made by $Ag^+-Li^+$ exchange in a neodymium-doped lithium-silicate glass substrate. A dye laser operating at 590 nm was end-fire coupled to the waveguide and the output was measured to show fluorescence at the emission wavelength of the neodymium-doped glass. FIG. 3 of Najafi et al. depicts a slab waveguide with gratings serving as mirrors to create a laser oscillator.

An laser oscillator is not a signal amplifier, because the output power is not a function of the input signal. A laser oscillator requires both a gain medium and a feedback means. It is possible to create a laser oscillator with a short path length and very small gain in a single traverse of the gain medium (single pass gain). Multiple passes through the gain medium are necessary to develop the required power level. The single pass gain in such a laser oscillator is not sufficient for a practical signal amplifier.

Accordingly, means other than oscillation between mirrors are required to increase the gain of a signal amplifier. One means for increasing the single pass gain is increasing the amount of the optically active species in a signal amplifier path of a given length. However, there is a limit to the concentration of rare earth dopant that may be included in a glass host without severe deleterious effects. And, the total amount of dopant required in a system for operation at a particular wavelength absorption band is a function of the pump absorption efficiency (stimulated emission cross section) of the dopant at that wavelength. Therefore, for some dopants used in systems operating at particular absorption on wavelengths, a relatively long length of amplifier waveguide is required to achieve a practicable level of amplifier gain.

German patent publication DE OS 2 260 987, assigned to Siemens is directed to a laser oscillator wherein the active material is provided in the form of a spiral waveguide (2) sandwiched between a substrate (1) and a transparent dielectric (4). An electroluminescent material (5) covers the transparent dielectric and is used to excite light in the waveguide which oscillates back and forth between its two ends. This laser oscillator configuration is unworkable as a signal amplifier because of the oscillation and because it is not possible to introduce the signal into the spiral waveguide, only the pump light.

German patent publication 2 140 500, also assigned to Siemens is directed to a optical detector including a meandering crystalline neodymium waveguide which is glued to a substrate. The waveguide operates as a gated preamplifier for the detector, and the active material is stimulated from above by a stimulating light source through a transparent layer applied over the waveguide. The stimulating radiation is applied over the entire length of the waveguide and not at one end. The waveguide is not integrated in a glass body, but is single crystal structure that is glued to a substrate.

It is therefore an object of the present invention to provide an optical signal amplifier which is economical and not cumbersome and which requires assembly of a minimum number of components.

Another object of the present invention is a method for making such an amplifier which allows integration of the amplifier components which are necessary for connecting the amplifier waveguide to the optical fibers which transport the optical signal.

SUMMARY OF THE INVENTION

These and other objects are achieved by means of the present invention which is directed to a stimulated emission optical signal amplifier comprising a glass optical waveguide doped with an optically active material capable of producing a population inversion under a pumping radiation. The amplifier includes means for coupling into the waveguide at one end pump power emitted by a laser at an absorption wavelength of the active material, and means for coupling into the waveguide signal power, modulated by the input signal to be amplified, at the emission wavelength of the active material. The waveguide is integrated into a glass body that is doped with the optically active material. The waveguide is integrated in the glass body in closely spaced adjacent guide lengths in order to minimize the space necessary for a given length of waveguide.

In one embodiment of the invention, the optical amplifier guide lengths form a spiral path. The spiral path may comprise successive half-circular guide lengths whose radii decrease in an arithmetic progression from the outside of the spiral toward its center.

In another embodiment of the invention, the optical amplifier guide lengths are coplanar and substantially parallel, and curved sections of waveguide connect each pair of adjacent guide lengths on one side. The curved sections of waveguide are formed on alternating sides of the body for successive pairs of guide lengths.

In yet another embodiment of the invention, the optical signal amplifier includes mirrors on two parallel faces of the glass body, and the waveguide defines a planar optical path zigzagging between these two mirrors.

In yet another embodiment of the invention, the waveguide may comprise several paths superimposed upon each other in different planes, with means for connecting the different paths to form the waveguide.

Another aspect of the invention is a method of making an optical signal amplifier by integrating and burying an optical waveguide into a glass body doped with optically active material. The integration and burial are carried out using photolithographic masking and ion exchange. The waveguide is integrated in the glass body in closely spaced adjacent guide lengths in order to minimize the space necessary for a given length of waveguide. Couplers may also be integrated in the doped glass body at the ends of the waveguide, the coupler at one end for providing the pump power input to the guide, and the coupler at the other end for extracting the amplified light signal.

By utilizing integrated optics technology to make the optical signal amplifier according to the invention, one obtains a compact amplifier capable of manufacture in great quantity and at reduced cost. In addition, other amplifier components may be integrated at the ends of the waveguide, for example, the pump laser itself can be associated directly with the amplifier, without pigtails, in a hybrid circuit.

DETAILED DESCRIPTION OF THE INVENTION

Figure 1:
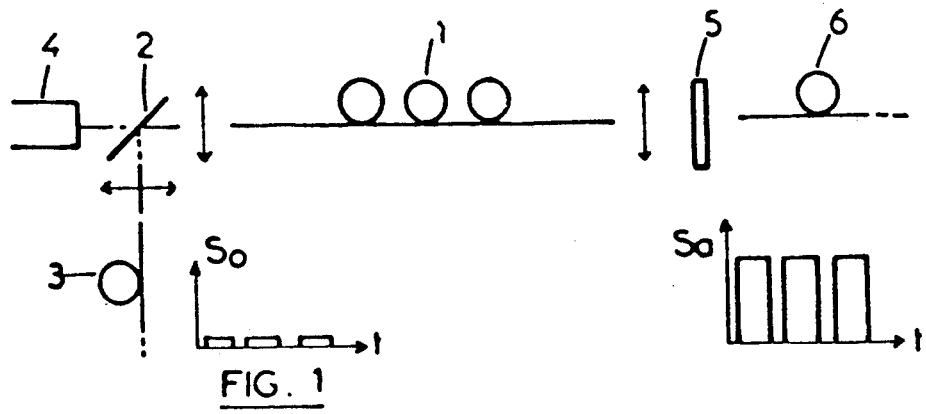
FIG. 1 is a schematic of an optical signal amplifier made according to the prior art.

FIG. 1 depicts an optical signal amplifier of the prior art, the description of which is useful for an appreciation of the benefits of the present invention. For further details concerning such an amplifier, one can refer to the articles mentioned above in the Background.

The amplifier in FIG. 1 includes an optical fiber several meters in length, for example, and wound on a spool for reasons of compactness. Three turns of the winding are depicted in FIG. 1. As described in the aforementioned articles, this fiber is made of glass doped with an optically active metallic oxide such as erbium ($Er^{3+}$) which is capable of developing an amplifying effect under the action of the emission of a pumping laser, or pump 4. The pump emission is delivered to the fiber 1 by a dichroic mirror 2. As known in the art, the pumping laser is chosen to emit pumping radiation at a wavelength corresponding to an absorption band of the optically active material in fiber 1. The fiber length is a function of the power of the pump and of the quantity of doping, which are themselves functions of the amplification required to amplify the input signal.

An optical signal $S_o$ to be amplified, modulated in a carrier light of wavelength $\lambda s$, and conveyed in an input optical fiber 3 or another waveguide, is injected into fiber 1 by reflection against the dichroic mirror 2. Signal $S_o$ is amplified by means of the stimulated emission in optical fiber 1. After amplification, signal $S_a$ is separated from the pumping energy by optical filter 5 at the output end of fiber 1.

The signal $S_a$ can then be reinjected into an output optical fiber 6 in order to be further transmitted, similar to retransmission after optoelectronic amplification by a repeater in existing telecommunications systems. Thus, the amplifier in FIG. 1 may be substituted for an optoelectronic repeater which is conventionally utilized to regenerate the signal to be retransmitted, after the signal has been attenuated over the length of optical fiber 3 whose end is coupled at the amplifier input.

As also described above, if one to several meters of optical fiber are necessary to attain the level of amplification necessary for the signal $S_o$, it is then necessary to wind the fiber on a spool, or bobbin. In addition, the wound fiber 1 must be connected to components 2 and 5, and further connection must be provided to input fiber 3 and and output fiber 6. This constitutes a cumbersome assembly which is tedious to produce and hence costly.

In accordance with the present invention, these difficulties are removed by the use of integrated optics technology to produce a waveguide which defines an optical path embedded in a glass body doped with an optically active material An amplifier effect is created in the optically active material by an inversion of population produced by a pumping radiation. Integrated optics technology is used to integrate into the doped glass body a waveguide path with maximized length per unit area. Thus, a compact amplifier is produced with a manufacturing method that lends itself to low cost mass production.

The method used is, preferably, that which is described in Dohan et al. U.S. Pat. No. 4,765,702, Beguin U.S. Pat. No. 4,933,262 and Dannoux et al. U.S. Pat. No. 4,943,130 which are assigned to the assignee of the present invention. For example, U.S. Pat. No. 4,765,702 describes the production of a photolithographic mask on the surface of a body of vitreous material such as glass. In order to obtain the amplifier effect required in the present invention, we use a glass body doped with a rare earth metallic oxide as the described above. The mask is formed in the shape of waveguide to be integrated into the body. A first ion exchange across the mask forms the waveguide in the body. A second ion exchange under an electric field, after the removal of the mask, embeds this waveguide below the surface of the body.

This method, which is similar to methods of production of integrated electronic circuits, lends itself to inexpensive mass production of waveguides in relatively complex shapes, which is advantageous in the present invention, as explained below.

Figure 2:
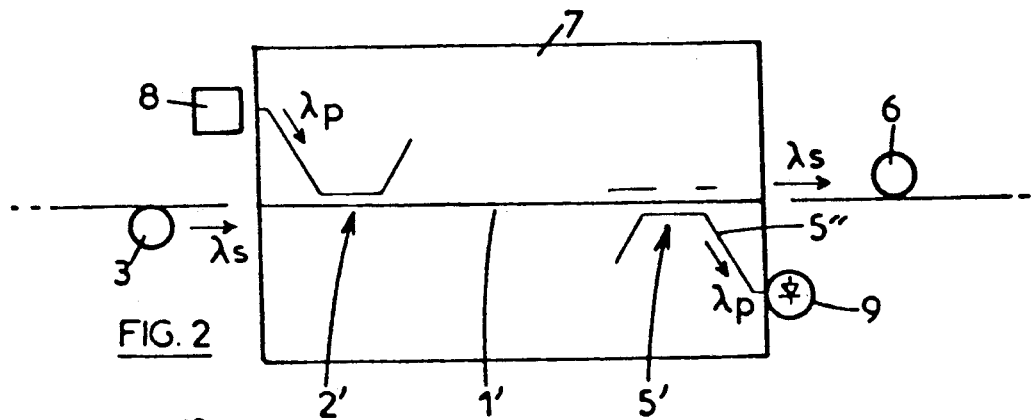
FIG. 2 is a schematic of an optical signal amplifier made in accordance with one embodiment of the present invention.

FIG. 2 is a schematic of an optical signal amplifier made in accordance with one embodiment of the present invention. In the following description, numerical references with a "prime" indicate identical or analogous features. The amplifier depicted in FIG. 2 comprises a vitreous (glass) body doped as described above with an optically active material in order to develop an amplifier effect. In accordance with the invention, body 7 contains an integrated waveguide 1' embedded below the surface of body 7. This guide is manufactured by means of a mask having the shape of waveguide 1 and a double exchange of ions, as described in U.S. Pat. No. 4,765,702.

In accordance with another embodiment of the invention, components such as a wavelength multiplexing coupler 2' and a wavelength demultiplexing coupler 5' may be integrated with the amplifier waveguide. These couplers may be produced by the same integrated optics technology as the waveguide 1'. Methods of producing such couplers as proximity couplers are described connection with in FIG. 4 of U.S. Pat. No. 4,765,702. This provides an integrated assembly of the waveguide and the couplers that is especially compact and appropriate for inexpensive mass production.

Coupler 2' is a wavelength multiplexing coupler 1, permitting the combination of two wavelengths in amplifier waveguide 1': i) pump energy at a wavelength $\lambda_p$, furnished by a pumping laser 8; and, ii) the signal to be amplified at wavelength $\lambda_s$ transmitted by input fiber 3. The demultiplexing coupler 5' permits the separation of the two wavelengths delivered to the amplifier output:
i) the amplified signal at wavelength $\lambda_s$ which is coupled to output optical fiber 6; and, ii) the unabsorbed pump energy at wavelength $\lambda_p$ which is coupled into another path 5" of demultiplexing coupler 5'. A photosensitive component 9, such as a semiconductor diode sensitive to radiation of length $\lambda_p$, may be used to provide an indication of the power coupled into this path. This indication may be used in a feed-back control (not shown) of the power of the laser pump 8.

Thus, in accordance with the present invention, a very small waveguide 1', of a diameter on the order of a few microns, for example, is integrated in body 7. This design retains the amplifier effect which is otherwise developed throughout the body because of the doping with optically active material. Dopants usable in the invention are described in Najafi et al., "Ion-exchanged rare-earth doped waveguides", First International Congress of Optical Science and Engineering, Apr. 24-28, 1989. See also, Najafi et al., "Ion-exchanged rare-earth doped waveguides", SPIE Vol. 1128 Glasses for Optoelectronics, 1989 pp. 142-144. The dopant is chosen such that one of the absorption bands of the doped glass will be centered at the wavelength of the pump laser emission, and in such a way that this absorption band will provoke a population inversion which will result in re-emission at the wavelength of the signal to be amplified, that is $\lambda_s$.

As an example, by doping with the erbium ion $Er^{3+}$, absorption bands centered upon 980 and 1480 nm may be created, with re-emission at about 1540 nm. The emission wavelength corresponds with that of the signal to be amplified, which is emitted by semiconductor laser diodes available commercially. A suitable amplifier effect is obtained with erbium concentrations on the order of a few percent in weight for waveguide interaction lengths on the order of one meter.

It is also possible to dope the glass with other metallic oxides, Nd or Yb, for example. Also, operation at another pump wavelength, for example 820 nm, may be achieved with erbium concentrations of less than 1 percent. The stimulation of the erbium results then from the pumping of the neodymium or the ytterbium and from a transfer of stimulation. One can thus improve the effectiveness of the pumping. We can refer in this respect to Barnes et al., "$Er^{3+}$- $Yb^{3+}$ and $Er^{3+}$ doped fiber lasers", "Journal of Lightwave Technology", Vol. 7, No. 10, Oct., 1989, pages 1461 ff.

In FIG. 2, the wavelength multiplexing coupler 2', as depicted, includes two waveguides in proximity. Advantageously, the multiplexer is optimized to minimize the attenuation of the two signals being superimposed, at a value less than 10% of the input power, for example. By minimizing the attenuation losses seen by the input signal $S_o$, the length of interaction which is necessary in amplifier waveguide 1', may also be minimized.

The length of latter is such that it must present an optimal length, which is a function of the power emitted by source 8 for transmission through amplifier fiber 8, and of the concentration of dopant ions present in the glass of body 7. This length typically may vary between 0.5 and 10 meters.

In a typical system, the amplified signal and the unabsorbed pump energy may be separated at the amplifier exit by means of a dichroic filter. In accordance with one embodiment of the present invention, this function is carried out by wavelength demultiplexing coupler 5', which is analogous to input coupler 2', but which functions in the inverse direction. This demultiplexer 5' can be optimized to minimize the pump power remaining in the path of the amplified signal and thus obtain a better signal to noise ratio. The utilization of such a demultiplexing coupler is advantageous in that the path of the amplified signal may be used for other purposes, for example the measurement of the power of the pump laser 8 by photosensitive component 9, in order to control the pump power by means of a feedback loop as described above.

Figure 5:
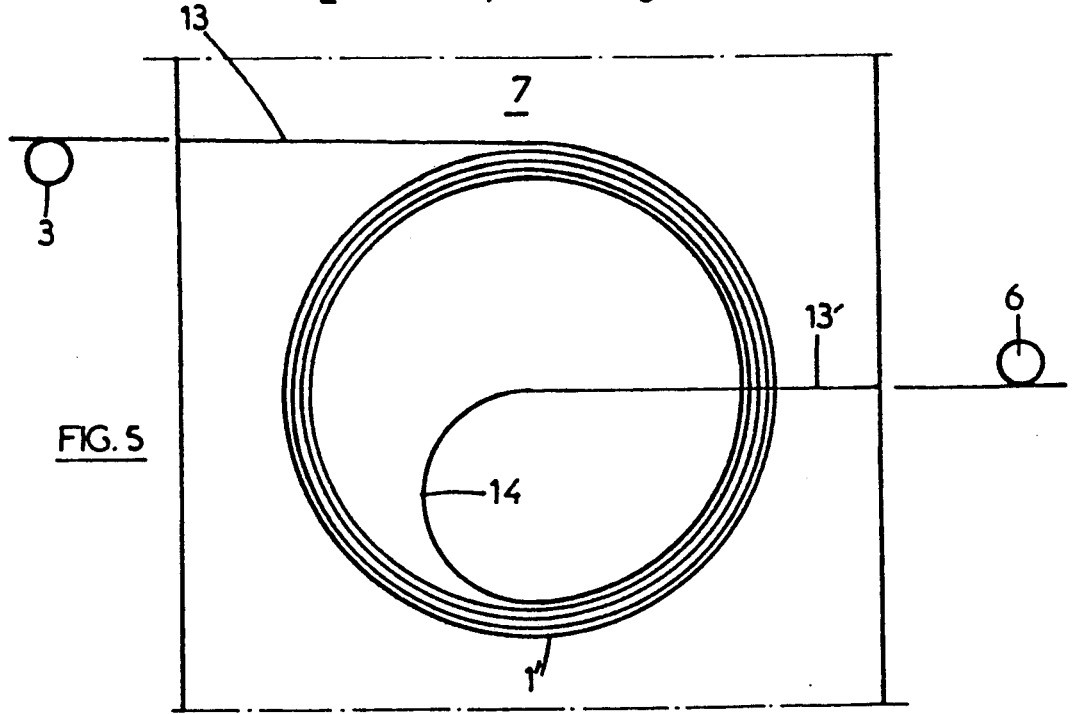
FIG. 5 illustrates a third embodiment of the amplifier waveguide of the present invention, made by integrated optics technology and utilizing a spiral path.
Figure 3:
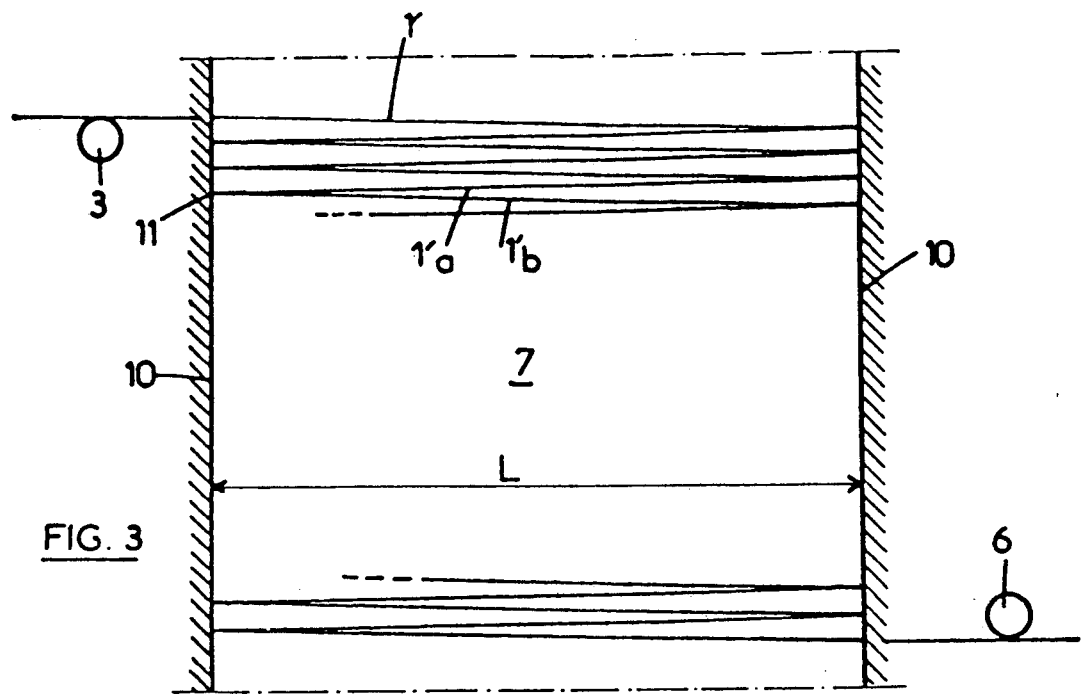
FIG. 3 illustrates one embodiment of the amplifier waveguide of the present invention, made by integrated optics technology and using parallel mirrors.
Figure 4:
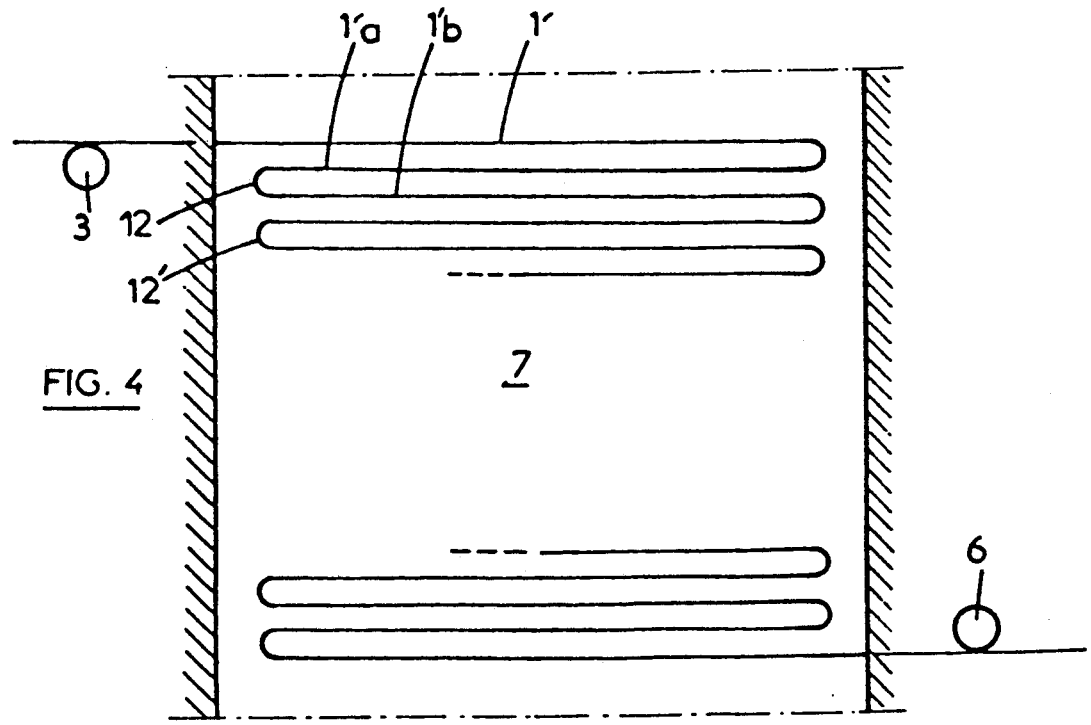
FIG. 4 illustrates a second embodiment of the amplifier waveguide of the present invention, made by integrated optics technology and utilizing curvilinear path connections.

We refer now to FIGS. 3 to 5 which depict various configurations of the amplifier waveguide in accordance with the present invention, each of which provides the compactness which is an essential feature of the invention. As described above, the length of the amplifier waveguide can vary, for example, between 0.5 and 10 meters. Integrated optical components are glass bodies with a small surfaces. The glass body used in the amplifier in accordance with the invention, should have a reduced surface area, on the order of 20 to 40 $cm^2$, for example. Therefore, according to the present invention, waveguide 1' has configuration which defines an optical path as long as possible within a space as small as possible.

In FIG. 3, two mirrors 10 are placed at two parallel faces of body 7, the waveguide 1' defining a zigzag optical path between the two mirrors 10. Two adjacent guide lengths 1'$_a$ and 1'$_b$ are connected with one mirror and then the other following symmetrical inclines with respect to a line normal to the mirror at connection point 11. Thus, the light received incident upon point 11, after transmission along a guide length 1', for example, is reflected in the adjacent guide length. Thus the input light is carried along the amplifier waveguide by means of successive reflections at each of the two mirrors up to end of guide 1' next to output optical fiber 6.

The mirrors 10 may be formed by the metallization of the two parallel surfaces of body 7. In another embodiment, these mirrors may be made of independent bodies joined to body 7.

As the integrated optics technology described above enables the creation of embedded waveguides with a diameter of only a few microns, we have invented the guide as depicted in FIG. 3 which enables the placement of a great length of waveguide within a glass body 7 having a very small surface.

In accordance with a another embodiment of the invention, as shown in FIG. 4, the lengths of consecutive guides (1'$_a$ and 1'$_b$, for example) are all coplanar and substantially parallel to one another, with adjacent guide lengths connected two by two on one side by curved waveguide sections such as 12, 12', etc. The curved waveguide sections are formed on alternating sides of the glass body 7 for successive pairs of guide lengths. This arrangement eliminates the necessity of the mirrors 10 that are depicted in FIG. 3, whose axial position tolerance can be critical. In order to minimize the losses due to propagation within the curved sections which have very small radii of curvature, the latter must not be of less than a certain value on the order of a millimeter, a value which is a function of the index differential between the amplifier waveguide and the remaining doped glass of body 7. As an example, in order that the loss due to the curvature not exceed 0.1 dB at each curvilinear section with a 2 mm radius of curvature, the index difference must be on the order of 1%.

A further embodiment of the invention which avoids the difficulties mentioned above, is depicted in FIG. 5, in which the amplifier waveguide is formed in a spiral path. As an example, the spiral path may comprise semicircular guide lengths connected at their ends and having decreasing diameters as the path moves from input fiber 3 toward output fiber 6, in accordance with an arithmetic progression. Fibers 3 and 6 are connected to the spiral path by tangential segments of guide 13 and 13', respectively. Preferably, semicircular length 14 is connected with output segment 13', in such a way that output segment 13' crosses the turns along a diameter of the semicircular guide lengths. This configuration enables the minimization of the losses at the intersections between the rectilinear segment 13' and the turns of the guide traversed by this segment.

As an example, according to the present invention, an amplifier waveguide approximately 2 meters long may be created with an initial diameter of about 40 mm and a terminal diameter of the final semicircle 14 of about 18.4 mm.

Numerous other configurations of spirals or other lines may be utilized in the amplifier in accordance with the invention, provided that the configurations ensure a close arrangement of the adjacent guide lengths, minimizing the space necessary for integrating a guide of a given length in body 7, as a function of the amplification required by the input signal.

The amplifier of the present invention presents numerous advantages. It is compact, lightweight and appropriate for inexpensive mass production. It introduces few losses, primarily due to the fact that the amplifier waveguide is embedded, which immunizes it against surface losses while establishing index profiles similar to those in a single mode fiber. Accordingly, the inventive amplifier design reduces the coupling losses between the integrated amplifier waveguide and output fiber 6 connected at the exit of the waveguide.

The utilization of integrated optics technologies for the production of the amplifier in accordance with the invention enables the production of complex circuits. For example, such a circuit may incorporate optical laser pumping in a manner analogous with that which is described in the above cited article of Najafi et al.

The invention is not limited to the particular methods of production described and represented herein, which have been provided only as examples. Hybridization techniques similar to those described in Dannoux et al. U.S. Pat. No. 4,943,130 may be used to align fibers 3 and 6 with the amplifier waveguide. Also, active components may be directly associated in a hybrid circuit with the amplifier waveguide 1', without pigtails, as depicted in FIG. 2. For example, the amplifier may include a pumping laser diode 8 and a photosensitive component 9 for the detection of unabsorbed pump light. The final optical component thus obtained is more compact and has higher performance, and the number of surfaces of the component is reduced.

Similarly, the separation of the amplified signal and the pump light at the amplifier waveguide exit may be accomplished with the aid of a dichroic filter placed in a groove crossing the waveguide (1') close to its exit end.

In addition, the application described above for the inventive amplifier (i.e., in an optical telecommunication circuit) is not exclusive. The inventive amplifier may also be used in any optical fiber network where there is high passive component density (e.g., connectors, couplers, multiplexers, etc.), if such a network requires the regeneration of transmitted signals.

Furthermore, the invention is not limited to an amplifier which includes a waveguide embedded in a single plane. If further compactness is desired for the component, the guide may be integrated in a volume in several superimposed guide sections, with means provided for optically connecting the different coplanar sections of the waveguide.

We claim:

1. A stimulated emission optical signal amplifier comprising a glass optical waveguide path doped with an optically active material capable of producing a population inversion under a pumping radiation, means for coupling into the waveguide path at one end pump power emitted by a laser at an absorption wavelength of said active material, and means for coupling into the waveguide path signal power, modulated by the input signal to be amplified, at the emission wavelength of said active material, wherein said waveguide path is integrated by ion exchange into a glass body that is doped with said active material, the total length of said waveguide path is at least 0.5 meter, and said waveguide path is integrated in closely spaced adjacent guide lengths in order to minimize the space necessary for said at least 0.5 meter total length.

2. The optical signal amplifier of claim 1, wherein said closely spaced adjacent guide lengths form a spiral path.

3. The optical signal amplifier of claim 2, wherein said spiral path comprises successive half-circular guide lengths whose radii are in an arithmetic progression.

4. The optical signal amplifier of claim 1, wherein said guide lengths are coplanar and substantially parallel, and further comprising curved sections of waveguide connecting each pair of adjacent guide lengths on one side, wherein said curved sections of waveguide are formed on alternating sides of said body for successive pairs of said guide lengths.

5. The optical signal amplifier of claim 1, further comprising mirrors on two parallel faces of said glass body, and wherein the waveguide defines a planar optical path zigzagging between these two mirrors.

6. The optical signal amplifier of claim 5, wherein said mirrors are integrated with said body by means of metallization of said body faces.

7. The optical signal amplifier of claim 1, wherein the waveguide comprises at least two paths superimposed upon each other in different planes, with means for connecting the different paths to form the waveguide.

8. The optical signal amplifier of claim 1, further comprising coupler means integrated in the doped glass body and associated with at least one end of said waveguide.

9. The optical signal amplifier of claim 8, wherein said coupler means comprises a coupler at one end of said waveguide for providing the pump power input to the guide, and a coupler at the other end for extracting the amplified light signal.

10. The optical signal amplifier of claim 8, wherein said coupler means comprises at least one proximity coupler.

11. The optical signal amplifier of claim 1, wherein said dopant comprises Erbium ions, and wherein said the wavelength of said signal power is in the range of 1540 nm.

12. The optical signal amplifier of claim 1, further comprising photosensitive means coupled to an output end of the waveguide for monitoring the unabsorbed pump power, and wherein said glass body, said pump laser and said photodetector means are interconnected in a hybrid circuit without pigtails.

13. The optical signal amplifier of claim 2, wherein said path terminates in an output segment of said waveguide path, and said output segment crosses at least one of the turns of the spiral path substantially along a diameter of said at least one turn.

* * * * *